United States Patent [19]

Froemke et al.

[11] Patent Number: 5,239,640
[45] Date of Patent: Aug. 24, 1993

[54] DATA STORAGE SYSTEM AND METHOD INCLUDING DATA AND CHECKSUM WRITE STAGING STORAGE

[75] Inventors: James W. Froemke; David A. Styczinski, both of Rochester, Minn.

[73] Assignee: International Business Machines Corporation, Armonk, N.Y.

[21] Appl. No.: 648,944

[22] Filed: Feb. 1, 1991

[51] Int. Cl.⁵ .............................................. G06F 11/12
[52] U.S. Cl. ...................................... 395/425; 371/11.1; 360/98.01; 364/DIG. 1; 364/DIG. 2
[58] Field of Search ... 364/200 MS File, 900 MS File; 395/400 MS File, 425 MS File

[56] References Cited

U.S. PATENT DOCUMENTS

| | | | |
|---|---|---|---|
| 4,092,732 | 5/1978 | Ouchi | 395/575 |
| 4,761,785 | 8/1988 | Clark et al. | 371/2.2 |
| 4,849,978 | 7/1989 | Dishon et al. | 371/53 |
| 4,870,643 | 9/1989 | Bultman et al. | 371/11.1 |
| 4,989,206 | 1/1991 | Dunphy, Jr. et al. | 371/10.1 |
| 4,993,030 | 2/1991 | Krakauer et al. | 395/600 |
| 5,124,987 | 6/1992 | Milligan et al. | 371/10.1 |

Primary Examiner—Joseph L. Dixon
Assistant Examiner—Reba I. Elmore
Attorney, Agent, or Firm—Mason, Kolehmainen, Rathburn & Wyss

[57] ABSTRACT

An outboard data storage system for a data processing system including a plurality of data DASD's and a dedicated checksum DASD. Write commands and checksum data calculated from the write commands are placed in a staging area under the control of an intelligent controller, operating in parallel with the data processing system CPU, that acknowledges execution of write commands as they are staged. The controller blocks data with contiguous addresses into single write commands and queues the write commands in an order corresponding to physical DASD addresses. Fast reads are achieved by executing read commands directly from the staging storage area and DASD writes are reduced by preempting write commands in the staging storage area with new write commands having the same address.

17 Claims, 5 Drawing Sheets

DATA STORAGE SYSTEM AND METHOD INCLUDING DATA AND CHECKSUM WRITE STAGING STORAGE

FIELD OF THE INVENTION

This invention relates to data processing and more particularly to reliable, economical and fast storage of data in direct access storage devices.

DESCRIPTION OF THE PRIOR ART

Data processing systems are commonly provided with data storage systems in which data is stored for use by the data processing system. A data storage system can include one or more direct access storage devices (DASD's). One commonly used type of DASD is a fixed disk drive assembly in which data is written to and read from magnetic disks. A number of DASD's may be employed to provide sufficient capacity to meet the data storage requirements of a data processing system.

One serious concern with data storage systems is the integrity of stored data. DASD's are subject to physical and mechanical failure and under such circumstances it can be difficult or impossible to recover data stored on the DASD. Various approaches have been used to decrease the possibility that data may be lost due to DASD failure. A common method is to periodically back up stored data by copying it to another storage system or device. But this does not avoid loss of data written to the storage system more recently than the last periodic back up.

A variation of the periodic back up approach is to mirror or shadow all stored data by storing it in duplicate on two different DASD's as it is written. If one set of the data is lost due to DASD failure, the redundant set of data can be used in its place. A disadvantage of this method is the expense of the DASD devices required for duplicate data storage.

Checksumming data recovery has been suggested as a way to provide acceptable data security without the expense of mirroring all stored data. In a checksum system, bits of data at corresponding locations in three or more data DASD's are used in an exclusive -OR calculation and the result is a string of transverse parity bits called a checksum. The checksum data is stored in a checksum DASD so that if a set of the source data is lost, it can be recovered and restored by an exclusive -OR calculation using the remaining data and the checksum data. In this way, the data in three or more DASD's can be protected using one DASD rather than the three or more DASD's that would be required with a data mirroring system.

Another important concern relating to data storage is speed of data storage and of data access. Data checksumming has not been an acceptable solution to the data integrity problem because of decreased system speed. In a checksum system, when stored data is revised and overwritten with new data, the checksum data must also be changed. In order to update the checksum data, the exclusive -OR of the old and new source data is calculated, and then the exclusive -OR of the result and the original checksum data is calculated to arrive at the new checksum data. System speed is impaired because for each data update, the data DASD must first be read and then rewritten, and the checksum DASD must also be read and then rewritten. The four read and write commands require time and, in addition, while the data DASD is in use, it is unavailable for read commands channeled from the data processing system.

Another problem with checksum systems as implemented in the past is that the checksum data storage creates a serious bottleneck that further slows system operation. Although system data read and write commands may be distributed among several data DASD's, the checksum data storage is more concentrated into one DASD or into fewer DASD's. Every time that data is written or updated on any of several data DASD's, the checksum data must be updated. The result is that the flow of read and write system commands is interrupted while the checksum data is maintained. The resulting speed penalty has prevented checksum techniques from fulfilling the goal of complete data protection with both speed and economy.

SUMMARY OF THE INVENTION

Among the important objects of the present invention are to provide a data storage system in which the cost savings of checksum data protection methods are realized without a penalty in system speed; to provide a system in which the updating of stored checksum data is streamlined and checksum data storage does not result in a bottleneck decreasing the system speed; to provide a system in which the availability of the storage system for system read commands is not blocked by checksum operations; to provide a system in which write command response time is not tied to write command and checksum data update processing; to provide a system in which system availability can be maintained during replacement of a failed data storage device; and to provide a data storage system overcoming disadvantages of those used in the past.

In brief, in accordance with the present invention there is provided a data storage system for a data processing system that provides data read and write commands. The data storage system includes a source data storage facility including a plurality of devices in which source data from the data processing system is written. A calculating unit calculates checksum data from the source data. The system includes a dedicated checksum storage facility in which calculated checksum data is written and a write staging storage area in which calculated checksum data is stored prior to being written in the dedicated checksum storage facility.

In brief, the present invention provides a method for storing data in a data processing system including the steps of staging write commands including source data and address information by placing them into a RAM staging area and removing the staged write commands from the staging area and writing the source data therefrom onto address locations on a plurality of data DASD's. Checksum data recovery information is calculated form data contained in write commands and is stored in the staging area. The stored checksum information is written onto a dedicated checksum DASD.

BRIEF DESCRIPTION OF THE DRAWINGS

The invention together with the above and other objects and advantages may be best understood from the following detailed description of the embodiments of the invention shown in the accompanying drawings, wherein.

DETAILED DESCRIPTION OF THE INVENTION

Figure 1:
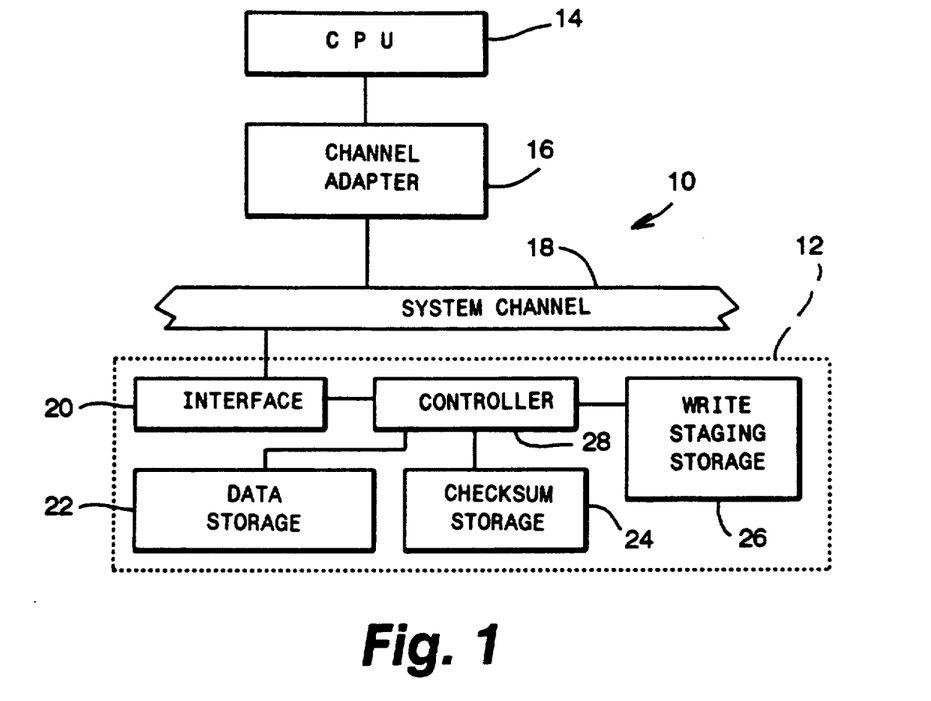
FIG. 1 is a simplified partial schematic block diagram of a data processing system having a data storage system constructed in accordance with the present invention.

With reference to the drawings and first to FIG. 1, there is shown part of a data processing or computer system generally designated as 10 having a data storage system generally designated as 12 and constructed in accordance with the principles of the present invention. Data processing system 10 includes a central processing unit (CPU) 14 that communicates through a channel adapter 16 with a high speed system channel or bus 18. The storage system 12 of the present invention is coupled to the channel 18 for exchange of data and commands with the system CPU. Other input/output devices (not shown) such as printers, keyboards, displays and the like may also communicate with the CPU through the system channel 18. Data that is supplied by or under the control of the CPU 14 is transmitted through the channel 18 for storage in the data storage system 12. To accomplish this, a write command including data to be stored is applied to the storage system 12 from the CPU. Conversely, data can be supplied from the storage system 12 for use by the CPU or by other components of the data processing system. This function is accomplished by a read command coupled to the system 12 through the channel 18.

In general, the data storage system 12 is implemented outboard and independent of the CPU 14 and includes a channel interface controller 20 governing communications between the system 12 and the channel 18 and a data storage facility 22 in which data received via the channel 18 is written and from which stored data is read. A dedicated checksum data storage facility 24 that is accessed independently of the storage facility 22 is provided for the storage of checksum parity bit information calculated from the data stored in data storage facility 22. The checksum information permits the recovery and restoration of lost data in the event of device failure in the data storage facility 22.

An important feature of this invention is the inclusion within the outboard system 12 of a write staging storage area 26, the use and operation of which is regulated and optimized by an intelligent controller 28. The data storage system 12 permits the flow of written and read data indicated schematically in FIG. 2, where the flow of written data is shown in solid lines and the flow of read data is shown in broken lines. Staging storage area 26 is preferably nonvolatile RAM, safe from power interruptions. Speed of the staging storage area 26 is substantially faster than that of the storage facilities 22 and 24, and the capacity of area 26 is relatively large. The intelligent controller 28 preferably operates parallel to and substantially independently of the operation of the CPU 14 so that internal management of the data storage system 12 can proceed without external CPU control.

Figure 2:
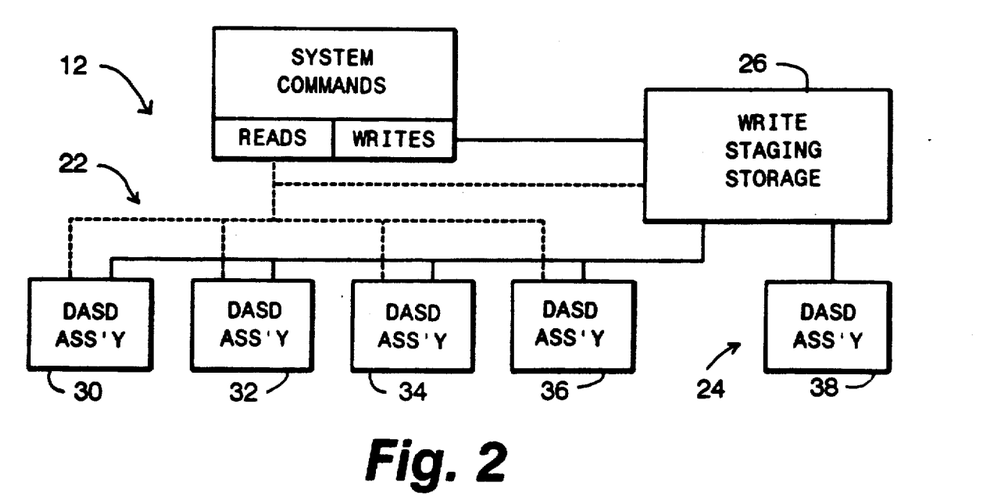
FIG. 2 is a schematic block diagram showing the flow of data in the data storage system of the present invention.
Figure 5:
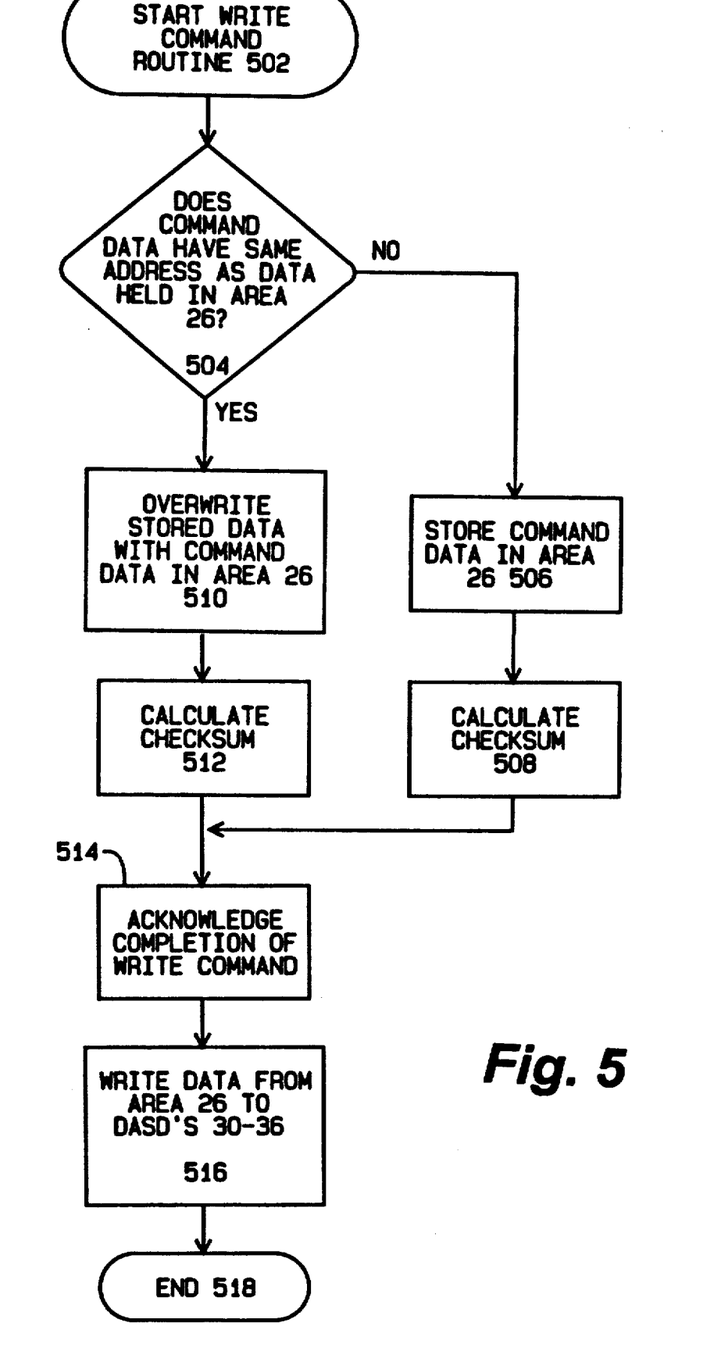
FIG. 5 is a flow chart showing a routine for handling data write commands in the data storage system in accordance with the present invention.

Referring to FIG. 2, a write command channeled to the data storage system 12 by the CPU 14 including source data for storage is initially placed in the write staging storage area 26 and an acknowledgement of completion of the write command is signalled without waiting for the data to be written to the data storage facility 22. Due to the speed of the write staging storage area 26, this transfer is accomplished quickly and the rapid acknowledgement frees the system resources promptly for other activities while the data storage procedures continue independently within the system 12. (Blocks 514 and 516 of FIG. 5). As a result, the data storage system 12 achieves a fast response time to write commands.

In the illustrated embodiment of the invention, the data storage facility 22 includes an array of DASD assemblies 30, 32, 34 and 36, although more or fewer DASD assemblies may be employed depending upon system requirements. The checksum data storage facility 24 is a dedicated, separate DASD assembly 38. Because the checksum data is segregated into a device 38 different from the devices 30-36 in which source data is stored, the reading and writing of data in the checksum device provides minimal interference with access to the data storage devices.

Data initially stored in the write staging storage area 26 is subsequently written to the DASD assemblies 30-36 and checksum information is calculated and written to the checksum DASD assembly 38. These data calculation and writing functions are controlled as described below independently of the operation of the CPU 14 and without substantially reducing the accessibility of the storage system 12 to further write and read commands.

Figure 4:
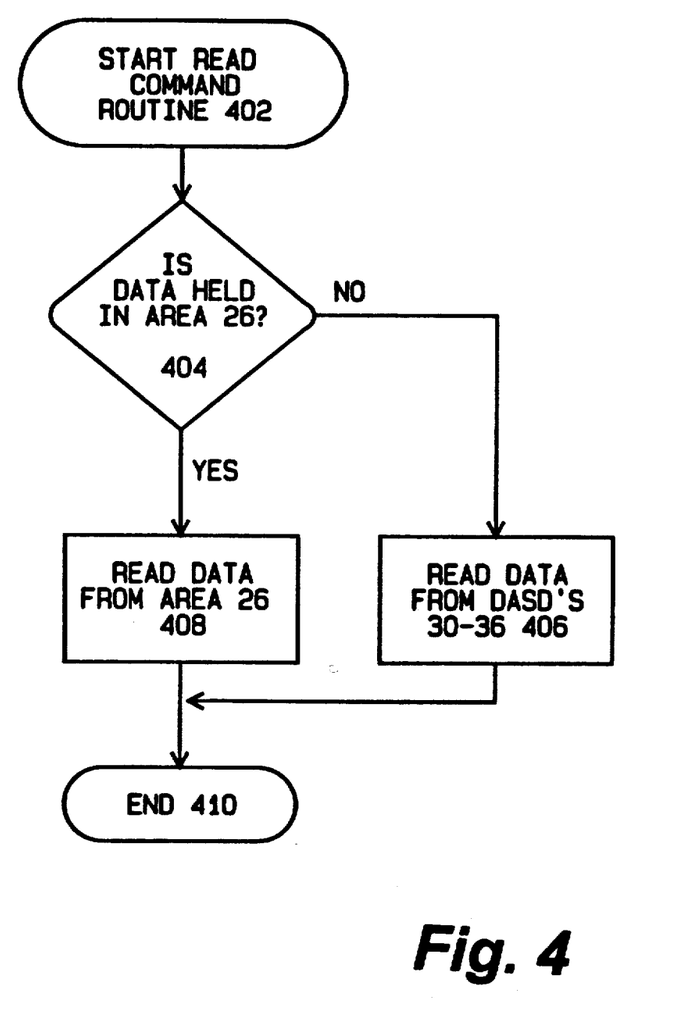
FIG. 4 is a flow chart showing a routine for handling data read commands in the data storage system in accordance with the present invention.

Because data to be written is stored in the write staging storage area 26, certain data handling advantages are possible. If new data is written to the same address as data held in area 26, the first write is preempted by the second and the first data in area 26 is replaced by the second data without writing the first data to a DASD assembly. Blocks 504 and 510 of FIG. 5). If a command is received to read data that is present in the write staging storage area 26, the data is read from the area 26 quickly and without the necessity for accessing a DASD assembly. (Blocks 404 and 406 of FIG. 4). Both of these operations increase data handling speed because they eliminate a relatively slow DASD access. Commands to read data that is not held in the staging storage area 26 are handled in the conventional manner by reading data from the DASD assemblies 30-36.

Figure 3:
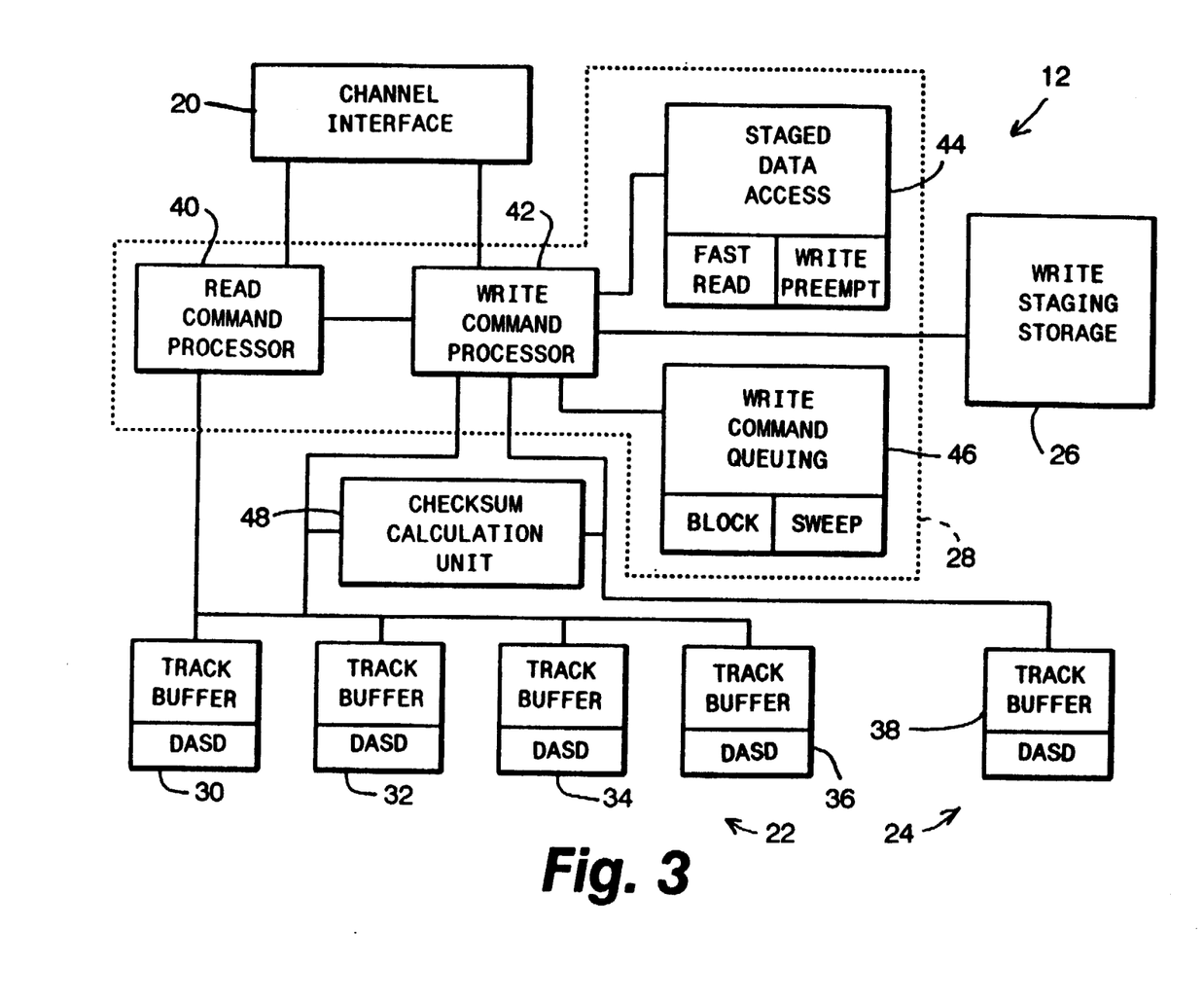
FIG. 3 is a schematic block diagram of functional elements of the data storage system of the present invention.

Functional elements of the data storage system 12 are seen in more detail in FIG. 3. The intelligent controller 28 includes a read command processor 40 and a write command processor 42 both connected to the channel interface 20 for receiving read commands and write commands transmitted through the channel 18. Associated with the write command processor 42 is a control unit 44 for access to data stored in the write staging storage area 26 and a control unit 46 for queuing of the data stored in the write staging storage area 26. Each DASD assembly 30-38 includes a DASD device preferably in the form of a magnetic disk drive assembly and a small, dedicated track buffer for holding a track of data to be written to the corresponding device. The command processors 40 and 42 are connected to communicate with one another and with the data DASD assemblies 30–36. The write command processor 42 also communicates with the write staging storage area 26, with the checksum DASD assembly 38 and with a checksum calculation unit 48.

A typical checksum data recovery method may be employed. As an example, assume that the following data bits are stored at the same physical addresses at the four DASD assemblies 30–36. The four sets of data bits are identified as data 1–4 in the following table. The checksum bits are obtained by performing exclusive -OR calculations on the columns of bits to determine the transverse parity of the columns of bits as indicated in the checksum bits row. The checksum data is stored for use in data recovery.

TABLE 1

| | |
|---|---|
| 1 0 0 1 0 1 0 0 | Data 1 |
| 1 1 1 1 0 1 0 1 | Data 2 |
| 0 0 0 1 1 0 1 1 | Data 3 |
| 1 1 1 1 0 0 1 1 | Data 4 |
| 1 0 0 0 1 0 0 1 | checksum bits. |

If data on one of the DASD assemblies 30–36 is lost, it can be recovered using the checksum information. For example, if Data 3 from table 1 is lost, an exclusive -OR calculation is made on the remaining source data and on the checksum data and the transverse parity bits are the same as the lost data bits:

TABLE 2

| | |
|---|---|
| 1 0 0 0 1 0 0 1 | Checksum bits. |
| 1 0 0 1 0 1 0 0 | Data 1 |
| 1 1 1 1 0 1 0 1 | Data 2 |
| 1 1 1 1 0 0 1 1 | Data 4 |
| 0 0 0 1 1 0 1 1 | Recovered data 3 |

When data is replaced by overwriting, the checksum data is also updated. Assume that data 2 of the above table 1 is to be replaced with new data 2. It is possible to calculate the new checksum bits by determining the transverse parity bits of all the source data:

TABLE 3

| | |
|---|---|
| 1 0 0 1 0 1 0 0 | Data 1 |
| 1 0 1 1 1 0 0 0 | New data 2 |
| 0 0 0 1 1 0 1 1 | Data 3 |
| 1 1 1 1 0 0 1 1 | Data 4 |
| 1 1 0 0 0 1 0 0 | New checksum bits |

Because this calculation requires reading data from all of the data DASD assemblies, it is preferred to calculate the new checksum data from the new and old data 2 and from the existing checksum data. First, an exclusive -OR calculation is made with the new and the replaced data.

TABLE 4

| | |
|---|---|
| 1 1 1 1 0 1 0 1 | Old data 2 |
| 1 0 1 1 1 0 0 0 | New data 2 |
| 0 1 0 0 1 1 0 1 | Data 2 exclusive-OR bits |

Then, the resulting data 2 exclusive -OR bits are compared in an exclusive -OR calculation with the existing checksum bits to be replaced in order to obtain the new checksum bits.

TABLE 5

| | |
|---|---|
| 0 1 0 0 1 1 0 1 | Data 2 exclusive-OR bits |
| 1 0 0 0 1 0 0 1 | Old checksum bits |

TABLE 5-continued

| | |
|---|---|
| 1 1 0 0 0 1 0 0 | New checksum bits |

This type of checksum data recovery approach has introduced undesirable delay in past implementations. Every write command requires that the existing data be read, that an exclusive or calculation be made, and that the new data be written. In addition, the existing checksum data must be read, another exclusive or calculation must be made, and the new checksum data must be written. These reads and writes interfere with other read commands and this interference contributes to degraded performance of checksum systems. This interference is reduced in the system 12 by avoiding unnecessary write commands to the DASD's 30–36 as described below. Although the source data reads and writes are distributed among several DASD's, the checksum data reads and writes are concentrated into one DASD or a smaller number of DASD's. Every write command requires checksum DASD access and the resulting bottleneck increase the response time of the storage system and slows the data processing system.

As indicated previously, the use of the dedicated DASD assembly 38 for checksum data storage permits the data DASD assemblies 30–36 to be accessed for execution of read commands during writes to the DASD assembly 38. The data DASD assemblies 30–36 need not all have the same capacity. The DASD assembly 38 should be as large as the largest data DASD or as large as the largest quantity of data on any one data DASD assembly that is to be protected. If desired, more than one checksum DASD assembly may be used.

In the system 12 of the present invention, all write commands coupled through the channel interface 20 are directed by the write command processor 42 of the controller 28 to the write staging storage area 26. When a write command is stored in area 26, the controller 28 signals completed execution of the write command to the CPU through interface 20 and channel 18 and write excecution delays are avoided. (Blocks 514 and 516 of FIG. 5). Independently of continued operation of the data processing system 10, the data to be replaced by the contents of the newly stored write command is read from the target DASD and is supplied to the checksum calculation unit 48 along with the new data. The resulting exclusive or bits are stored in the write staging storage area 26.

Unlike typical disk buffer and cache arrangements, the write staging storage area 26 has a relatively large capacity to permit the use of data handling techniques that streamline data throughput and minimize the duration of access to the checksum DASD assembly 38, thereby to avoid the checksum bottleneck problem experienced with past systems. Preferably the capacity of the storage area 26 is large enough to hold hundreds or thousands of write commands along with the associated checksum information. For example, in a data processing system with DASD devices having capacities of about 500 megabytes (Mb) or more, average write command lengths of about 4 kilobytes (Kb) and a maximum write command length of 256 Kb, advantages of the invention can be realized with a write staging storage area of about 1 Mb minimum size, with the range of 2 Mb to 16 Mb and a specific value of about 8 Mb being preferred.

Source data and checksum data is written to the DASD assemblies 30–38 by transducer heads that sweep along paths over the surfaces of the magnetic media of the DASD's. Data storage sectors in tracks defined on the media have addresses that are used to locate the heads in registration with specific regions of the media for writing or reading data, and these addresses have a sequence related to the head sweep path. For example, in typical DASD assemblies, the heads sweep from the lowest physical data address to the highest physical data address. One reason for using a relatively large staging storage area is to permit the use of data queuing techniques for enhancing performance of the system by coordinating the writing of data to the DASD assembly 38 with the physical data addresses along the sweep path to enhance the speed of operation of the DASD assembly 38.

As indicated in FIG. 3, the write command queuing control unit 46 includes data blocking and sweep ordering functions. Normally the staging storage area 26 is filled with numerous write commands ready for writing to one of the data DASD's 30–36. Each write command is associated with a corresponding exclusive or checksum calculation result provided by the checksum calculation unit. This exclusive or checksum data is used for calculating new checksum data to be written on the DASD assembly 38. Preferably, the write command source data and the checksum data have the same physical addresses but on different DASD assemblies: the checksum data on DASD assembly 38 and the source data on one of the DASD assemblies 30–36.

When data is removed from the write staging storage area 26 for writing to the DASD assemblies, the DASD assembly 38 is read to obtain the existing checksum data. The existing checksum data together with the checksum calculation data from the area 26 are supplied to the checksum calculation unit 48 where an exclusive or calculation is made to obtain the new checksum data that is then written to the DASD assembly 38. Preferably the unit 48 is fast enough to permit the old data to be read and then to permit the new data to be written in consecutive or close passes of the magnetic media under the transducer head.

Another alternative is to read the existing checksum data and make the exclusive or calculation and store that result, namely the new checksum data, in the write staging storage area 26. With this approach, the checksum data is written from the area 26 onto the DASD assembly 38 without the need for further calculations. At or prior to the time that the new checksum data is written to the DASD assembly 38, the corresponding new source data is written to the same physical address on one of the data DASD assemblies 30–36. In order to maximize the benefit of the write preempt function described below, it is preferred that the the new source data be held in the write staging storage area 26 and that the writing of that data to the DASD's 30–36 be delayed until writing of the corresponding checksum data is to be accomplished.

Figure 6:
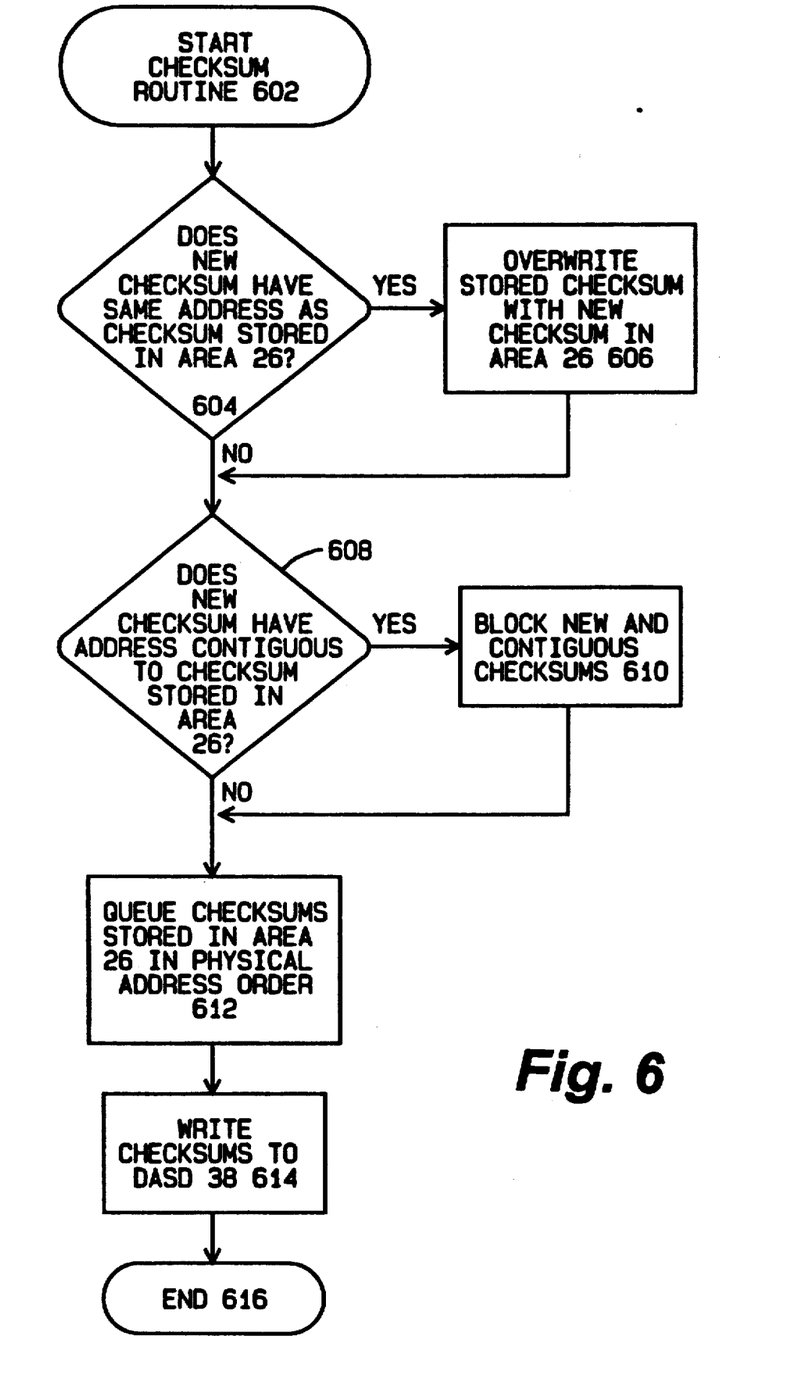
FIG. 6 is a flow chart showing a routine for checksum information in the data storage system in accordance with the present invention.

The data blocking function of the control unit 46 is carried out by identifying data that has adjacent and consecutive addresses. While it resides in area 26, this data is combined into a block of data contained in a single write command before being written onto the DASD assemblies. (Blocks 608 and 610 of FIG. 6). This speeds the write operation because it is faster to execute one longer command than a number of shorter commands. The sweep function of the control unit 46 is carried out by ordering the stored data with its physical addresses in the same order as the head sweep path of the checksum DASD 38. Data queued in this order flows to the DASD assembly as the head sweeps the storage media, and data is written with no unnecessary head movement. (Blocks 612 and 614 of FIG. 6). The time lost to head seeking movement is minimized. In a preferred embodiment of the invention, the storage area is large enough so that in typical operation, checksum data is written on the average in about every third or fourth track as the head sweeps the data storage medium.

The staged data access control unit 44 permits access to and use of data stored in the staging storage area 26 prior to the writing of that data to one of the DASD assemblies. The control unit 44 includes a fast read function. When a read command is received by the read command processor 40, the control unit 44 is interrogated to determine whether any of the requested data is present in the write staging storage 26. If so, then that data is provided to the read command processor and the read command is executed without the need to access any of the DASD assemblies. 404 and 406). This provides a speed increase because RAM speed is substantially faster than DASD speed. A typical DASD may have an access time with an order of magnitude in the millisecond range, while typical RAM storage may provide data access times in the nanosecond range. Requested data may also be present in the track buffers of the DASD assemblies 30–36 and this provides an additional source of fast reads.

Staged data access control unit 44 also has a write preempt function. Write commands that are received by the write command processor 42 are checked to determine if they are overwrites of data that is held in the staging storage area 26. If so, the data to be replaced is removed from the data writing queue and is provided along with the new write command to the checksum calculation unit 48 for a new exclusive or calculation. The new data and the corresponding checksum data are then added to the write staging storage area 26. (Block 510 of FIG. 5 and block 606 of FIG. 6). This speeds the operation of the system 12 by avoiding the writing of overwritten data to the DASD assemblies.

As an alternative to reading the existing data and performing an exclusive or calculation following receipt of a write command, the write command can be stored in the area 26 without reading of the preexisting data to be replaced. In this approach, the data DASD and the checksum DASD would both be read and the exclusive or calculations would be made when the write command reaches the head of the queue. The advantage is that a write preempt would eliminate not only the final checksum calculation and data and checksum writes but also would avoid the need for the initial data read and checksum calculation.

The checksum calculation unit may be incorporated into the controller 28 or into the write staging storage area 26 rather than being a discrete unit. The staging storage area 26 may include DRAM's or SRAM's provided with battery back up power to be immune from power interruptions. Alternatively, volatile RAM may be used in conjunction with a DASD write journal for recovery of RAM contents after a power loss. Other non-volatile RAM such as charge wells or magnetic particles may be used.

In the event of power interruption, data storage status is preserved and there is no loss of data not yet written to the DASD assemblies 30-38. In addition, the availability of the storage system 12 can be maintained if one of the data DASD assemblies fails and must be replaced. The other DASD assemblies are available for execution of read commands and the data formerly stored in the failed data DASD assembly is available for access and recovery purposes using the checksum data and other stored source data. In addition, if one data DASD is disabled, write commands can continue to be executed.

We claim:

1. A data storage system for a data processing system that provides data read and write commands, said data storage system comprising in combination:
   a data storage facility including a plurality of devices in which data from the data processing system is written;
   calculating means for calculating checksum data from said data;
   a dedicated checksum storage facility in which calculated checksum data is written; and
   a write staging storage area shared by said plurality of devices and by said dedicated checksum storage facility in which calculated checksum data and data from the data processing system are stored prior to writing checksum data in said dedicated checksum storage facility.

2. A data storage system as claimed in claim 1 in which said data storage facility includes a plurality of DASD's and said dedicated checksum storage facility includes another DASD.

3. A data storage system as claimed in claim 2 wherein said write staging storage area comprises RAM.

4. A data storage system as claimed in claim 2 wherein said write staging storage area comprises non-volatile RAM.

5. A data storage system as claimed in claim 1 further comprising a controller for controlling the data storage system in response to read and write commands, said controller operating in parallel with the data processing system.

6. A data storage system for a data processing system that provides data read and write commands, said data storage system comprising in combination:
   a data storage facility including a plurality of devices in which data from the data processing system is written;
   calculating means for calculating checksum data from said data;
   a dedicated checksum storage facility in which calculated checksum data is written;
   a write staging storage area in which calculated checksum data is stored prior to writing checksum data in said dedicated checksum storage facility; and
   a controller for controlling the data storage system in response to read and write commands, said controller operating in parallel with the data processing system;
   said controller including queuing means for ordering checksum data in said write staging storage area in an order corresponding to addresses in said dedicated checksum storage facility.

7. A data storage system for a data processing system that provides data read and write commands, said data storage system comprising in combination:
   a data storage facility including a plurality of devices in which data from the data processing system is written;
   calculating means for calculating checksum data from said data;
   a dedicated checksum storage facility in which calculated checksum data is written;
   a write staging storage area in which calculated checksum data is stored prior to writing checksum data in said dedicated checksum storage facility; and
   a controller for controlling the data storage system in response to read and write commands, said controller operating in parallel with the data processing system;
   said controller including blocking means for combining checksum data having adjacent addresses into single write commands.

8. A data storage system for a data processing system that provides data read and write commands, said data storage system comprising in combination:
   a data storage facility including a plurality of devices in which data from the data processing system is written;
   calculating means for calculating checksum data from said data;
   a dedicated checksum storage facility in which calculated checksum data is written;
   a write staging storage area in which calculated checksum data is stored prior to writing checksum data in said dedicated checksum storage facility; and
   a controller for controlling the data storage system in response to read and write commands, said controller operating in parallel with the data processing system;
   said controller including write preempt means for replacing write commands in said write staging storage area with newer write commands having the same address.

9. A data storage system for a data processing system that provides data read and write commands, said data storage system comprising in combination:
   a data storage facility including a plurality of devices in which data from the data processing system is written;
   calculating means for calculating checksum data from said data;
   a dedicated checksum storage facility in which calculated checksum data is written;
   a write staging storage area in which calculated checksum data is stored prior to writing checksum data in said dedicated checksum storage facility; and
   a controller for controlling the data storage system in response to read and write commands, said controller operating in parallel with the data processing system;
   said controller including read command processing means for executing read commands by reading data from said write staging storage area.

10. A method of storing data in a data processing system comprising the steps of:
    staging write commands including data and address information by placing them into a common RAM staging area;

removing staged write commands from the staging area and writing the data therefrom onto address locations on a plurality of data DASD's;

calculating checksum data recovery information from data contained in write commands;

storing in the common staging area checksum information corresponding to staged write commands; and writing checksum information onto a dedicated checksum DASD.

11. The method of claim 10 further comprising identifying checksum information stored in the staging area having contiguous addresses and combining the located checksum information into single blocks.

12. The method of claim 11 further comprising queuing checksum information stored in the staging area into an address sequence corresponding to physical addresses in the checksum DASD.

13. The method of claim 10 further comprising executing read commands for staged data by reading the staged data from the staging area.

14. The method of claim 10 further comprising preempting staged write commands by replacing them in the staging area with new write commands having the same address.

15. A data storage system as claimed in claim 1 wherein said write staging storage area has a capacity of more than about one megabyte.

16. A data storage system as claimed in claim 15 wherein said write staging storage area has a capacity in the range of about two to about sixteen megabytes.

17. A data storage system as claimed in claim 16 wherein said write staging storage area has a capacity of about two to about eight megabytes.

* * * * *